United States Patent [19]
Baker

[11] Patent Number: 5,490,746
[45] Date of Patent: Feb. 13, 1996

[54] CYLINDRICAL THREAD CUTTING AID

[76] Inventor: Raymond L. Baker, 5370 Cuba Rd., Wilmington, Ohio 45177

[21] Appl. No.: 298,176

[22] Filed: Aug. 30, 1994

[51] Int. Cl.⁶ .................................................... B23G 5/00
[52] U.S. Cl. ........................ 408/123; 408/221; 470/207
[58] Field of Search .................................. 408/120, 123, 408/200, 221; 470/67, 207

[56] References Cited

U.S. PATENT DOCUMENTS

| 338,282 | 3/1886 | Miller | 470/207 |
|---|---|---|---|
| 465,622 | 12/1891 | Baird | 470/207 |
| 812,075 | 2/1906 | McKimmey | 408/123 |
| 2,177,091 | 10/1939 | Briegel | 408/202 |
| 4,856,946 | 8/1989 | Park | 408/123 |
| 4,927,302 | 5/1990 | Beaty | 408/221 |
| 5,299,895 | 4/1994 | Greenhill | 408/123 |
| 5,343,787 | 9/1994 | McDonnell | 408/221 |

Primary Examiner—Daniel W. Howell
Attorney, Agent, or Firm—Joseph P. Burke

[57] ABSTRACT

The disclosure is directed to a pipe cylindrical thread cutting aid that has an inner cylindrical wall, which extends throughout its length; a pair of outer cylindrical walls between which lies a shoulder which is substantially perpendicular to these outer walls, which are substantially parallel to one another, and leading and trailing surfaces. The thread cutting aid of this invention allows near perfect alignment of the thread cutter with the work piece, permits starting and finishing thread cutting using one hand and permits the thread repair and cutting in close quarters ordinarily not reachable and attainable using prior art thread cutting tools. The thread cutting aid of this invention is particularly well suited for use in the shop where the pipe can be stabilized, e.g., in a vice or equivalent device, and to thread pipe softer than stainless steel or other equivalent steel pipe work piece which are resistant to cutting which occurs during threading, e.g., stainless steel pipe.

2 Claims, 2 Drawing Sheets

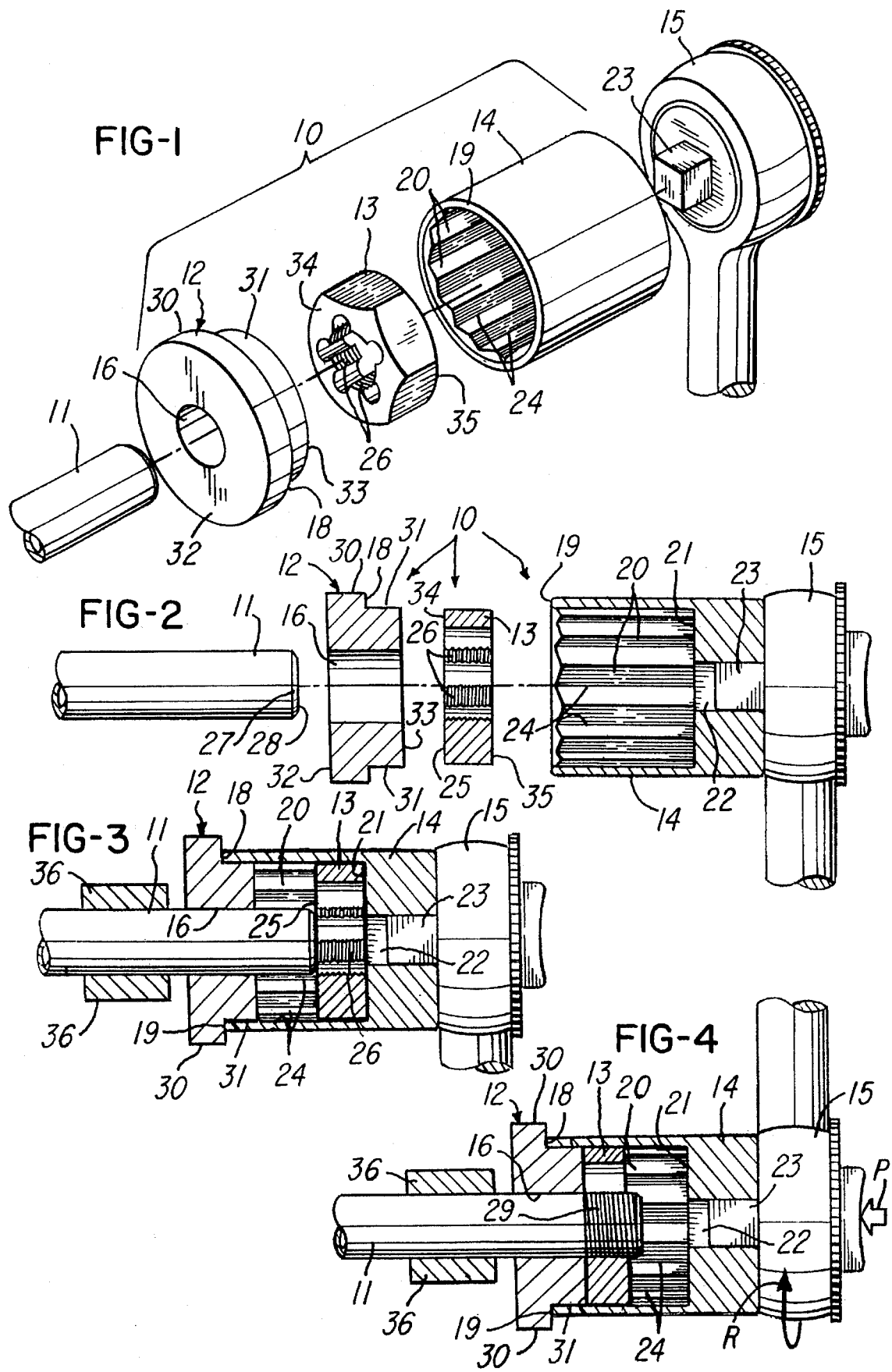

5,490,746

CYLINDRICAL THREAD CUTTING AID

BRIEF DESCRIPTION OF THE INVENTION

The pipe cylindrical thread cutting aid of this invention has an inner cylindrical wall, which extends throughout its length; a pair of outer cylindrical walls between which lies a shoulder which is substantially perpendicular to these outer walls, which are substantially parallel to one another, and leading and trailing surfaces.

The thread cutting aid of this invention allows near perfect alignment of the thread cutter with the work piece, permits starting and finishing thread cutting using one hand and permits the thread repair and cutting in close quarters ordinarily not reachable and attainable using prior art thread cutting tools. The thread cutting aid of this invention is particularly well suited for use in the shop where the pipe can be stabilized, e.g., in a vice or equivalent device, and to thread pipe softer than stainless steel or other equivalent steel pipe work pieces.

BACKGROUND OF THE INVENTION AND PRIOR ART

There has long been a need for a thread cutting aid which will permit near perfect alignment of the thread cutter with the pipe work piece; will permit starting and finishing of the thread cutting using one hand and permit the thread repair and cutting in close quarters ordinarily not reachable using prior art tools.

Various attempts have been made in the prior art to solve the above indicated problems. However, as will be apparent from the discussion of the two patents below, these attempts have proved unsuccessful.

U.S. Pat. No. 2,273,598 issued Feb. 17, 1942 to C. W. Shafer, is directed to a die stock. The die stock of the Shafer Patent employs a fixed or buttonhead die such as is used for the threading of bolts. The Shafer die stock provides a guiding head carrying the button die in such manner that chips, formed by placing threads onto bolts, will readily clear from the bolt being threaded. Shafer accomplishes this by mounting the button die in one end of a tubular head, the other end portion of which constitutes the pipe guide, and is acted on externally by means to rotate the head, while between the driving portion and the die-carrying portion, the head has lateral openings which lead directly to the region at the inner face of the die.

The patentee states that the die-carrying head, is a very simple device which preferably contains one single integral steel casting which receives a cutting die of standard configuration and effectively holds it in position thus enabling its ready rotation while the guiding sleeve coacts with the bolt being threaded maintaining the die exactly perpendicular to the bolt axis. This structure is stated to be associated with clearance passageways which discharge the chips as they are formed and is said to prevent any clogging at the teeth.

U.S. Pat. No. 4,927,302 issued to Robert A. Beaty on May 22, 1990, is directed to a threading device which can cut a uniform and symmetrical screw thread in the outer surface of a round bar or tube. The Beaty threading device includes a die nut having internal cutting threads and two axial holes and a guide ring which includes two axial roll pins extending away from a rear face thereof and which are capable of extending into the axial holes in the die nut without play to align the axis of the guide ring with the axis of the die nut. The guide ring is stated to act to maintain the axis of the die nut coaxial with the axis of a round bar or tube which extends through the bore of the guide ring and contacts the cutting threads in the die nut. The die nut, together with the guide ring, can be manually rotated to cut a screw thread in a round bar or tube by means of a conventional wrench.

BRIEF DESCRIPTION OF THE DRAWINGS

FIG. 1 is a fragmentary exploded perspective view indicating the thread cutting aid of this invention in its environment of use with the associated components with which it is employed to perform its desired task and obtain the objectives.

FIG. 2 is a fragmentary elevational view with parts in cross section, parts broken away and parts exploded.

FIG. 3 is a fragmentary elevational view as in FIG. 2, having parts in cross-section, parts broken away and parts exploded but wherein the thread cutting aid, thread cutting die, full-fluted socket member and a ratchet wrench are assembled on the work piece pipe in a ready position for threading.

FIG. 4 is a view similar to that of FIG. 3 but showing moved positions of the die cutting aid thread cutting die and full-fluted socket member as they operate in threading the desired end of the pipe work piece.

DETAILED DESCRIPTION OF THE INVENTION

Figure 5:
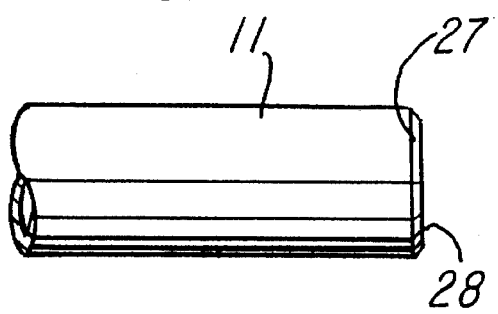
FIG. 5 is an enlarged fragmentary elevational view of the pipe work piece prepared for cutting of the thread therein.

Prior to utilization of the thread cutting aid of this invention to cut the threads in the desired end of the pipe; the desired pipe end should be prepared for threading by squaring off the end to be threaded, viz., making the end straight vertically, and beveling it slightly from its medial to distal end. This can be accomplished by using a tubing cutter of appropriate size, die grinder with cut-off wheel and/or file to arrive at the prepared pipe which is illustrated in FIG. 5 of the drawings.

This invention has two basic aspects. The gist of the invention is the thread cutting aid (12). The second aspect of this invention is the combination (10) utilizing thread cutting aid (12), thread cutting die (13) and full fluted socket member (14).

Referring now to FIGS. 1 through 4, the combination according to the present invention (10) includes cylindrical thread cutting aid (12), thread cutting die (13) having six, or twelve, points in its outer surface to mate with the valleys (24) in the interior of full fluted socket member (14).

The end of the work piece, viz., pipe (11,) is inserted into the smaller diameter opening (16) of the thread cutting aid (12) engaging the outer diameter of (11) closely permitting threading. The outer diameter of pipe (11) fits snugly within opening (16) so that (16) is closed during thread cutting.

As is more clearly apparent from FIG. 2, thread cutting aid (12) has inner cylindrical wall (16) which extends throughout its length. It (12) also has a pair of outer cylindrical walls (30) and (31) between which lies shoulder (18) which is substantially perpendicular to (30) and (31). Walls (30 and 31) are substantially parallel with one another with wall (30) having the larger diameter and wall (31) having the smaller diameter and both (30) and (31) being annular surfaces. In addition, (12) has a leading surface (32) and a trailing surface (33).

Thread cutting die (13) has chasers (26) and has its leading surface (34) and its trailing surface (35). The chasers begin cutting on the side shown at (25) viz., at the leading surface (34) of (13).

In order to use the combination (10) according to this invention, the leading surface (32) of (12) is placed on the previously prepared beveled and squared off end (27), (28) of (11) as shown in FIG. 5.

Inner cylindrical wall (16) is placed over (11) and moved to its ready position for threading as shown in FIG. 3. The leading surface (34) of thread cutting die (13) is placed on pipe (11) so that (34) abuts against the thread cutting aid trailing surface (33) as shown in FIG. 3 with (13) being in its ready position for threading. Full fluted socket member (14), having flutes (20) and valleys (24), is then placed over (12) and (13) so that the leading end (19) abuts against shoulder (18) and the trailing surface (35) of thread cutting die (13) abuts against shoulder (21) of (14) as shown in FIG. 3 with (14) being in its ready position for threading.

Figure 6:
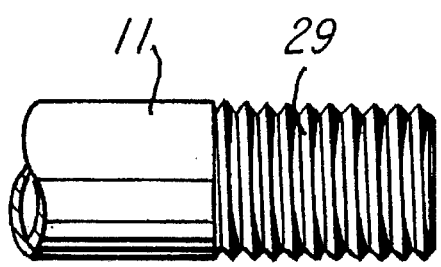
FIG. 6 is an enlarged fragmentary elevational view of the work piece similar to FIG. 5 but showing the threads which have been placed on the work piece pipe.

The driver member (23) of ratchet wrench (15) is then inserted into opening (22) of (14) as shown in FIG. 3 and (15) is rotated in the direction of arrow (R) while pressure (P) is applied to cut the threads right-handed as shown in FIG. 4. Upon completion of threading the finished pipe (11) is as shown in FIG. 6 containing threads (29). To assist in grasping pipe (11) and stabilizing it for threading, it is preferred to place its portion proximal to where the threading is to occur within the jaws (36) of a vise or other equivalent device, as is shown in FIGS. 3 and 4.

I claim:

1. A combination thread cutting aid and thread cutting die wherein said thread cutting aid has leading and trailing surfaces, an inner cylindrical wall extending throughout its length engaging the outer diameter of a pipe to be threaded and closed during the threading, a pair of substantially parallel outer cylindrical walls, one having a larger outer diameter than the other and parallel with said inner cylindrical wall with both outer cylindrical walls being annular surfaces and a shoulder between said outer walls which is substantially perpendicular to said outer walls, and wherein said thread cutting die has inner and outer surfaces, a leading surface and a trailing surface, and full fluted socket member open at both ends and having an interior portion containing an internal shoulder, an exterior portion, a leading end constituting a larger opening, a trailing end constituting a smaller opening and internal flutes and valleys extending from said leading end to said internal shoulder and wherein said smaller opening is capable of receiving a ratchet wrench driver.

2. A combination as in claim 1 wherein said outer surface of said thread cutting die mates with said interior portion of said full fluted socket member during use of said combination.

* * * * *